United States Patent [19]

Klievoneit et al.

[11] Patent Number: 4,605,249
[45] Date of Patent: Aug. 12, 1986

[54] ROTARY COUPLING FOR FLUIDS

[75] Inventors: Harold R. Klievoneit, Mesa; Augustine G. Esposito, Phoenix, both of Ariz.

[73] Assignee: St. Florian Company, Phoenix, Ariz.

[21] Appl. No.: 454,998

[22] Filed: Jan. 3, 1983

[51] Int. Cl.$^4$ .............................................. F16L 17/00
[52] U.S. Cl. .................................... 285/98; 285/190; 285/276; 285/281
[58] Field of Search ............... 285/190, 273, 274, 136, 285/134, 276, 281, 98

[56]  References Cited

U.S. PATENT DOCUMENTS

| 1,053,621 | 2/1913 | McAllister | 285/134 X |
| 2,425,211 | 8/1947 | Strickland | 285/134 X |
| 3,545,342 | 12/1970 | Hiestand | 285/190 X |

FOREIGN PATENT DOCUMENTS

| 2100579 | 7/1971 | Fed. Rep. of Germany | 285/190 |
| 2146519 | 3/1973 | Fed. Rep. of Germany | 285/190 |
| 2655247 | 6/1978 | Fed. Rep. of Germany | 285/190 |

Primary Examiner—Dave W. Arola
Attorney, Agent, or Firm—Cahill, Sutton & Thomas

[57] ABSTRACT

A stationary annular plenum rotatably mounted upon a hollow shaft receives air from a stationary source of air under pressure. A spring loaded first ring within the plenum conveys the air through apertures therein from the plenum to corresponding apertures in an adjacent second ring, which rings are maintained in alignment with one another and the plenum by a plurality of dowels. An annular channel disposed in a radial face of the second ring interconnects the apertures extending through the ring; the channel mates with a corresponding channel of an adjacent disc fixedly mounted upon the shaft to convey air from the stationary elements to the rotating elements. An air seal between the second ring and the disc is formed by interfacing flat annular radially oriented surfaces on opposed sides of the respective channels. The disc includes a radial passageway interconnecting the channel formed therein with the bore of the hollow shaft to direct air into the bore.

4 Claims, 4 Drawing Figures

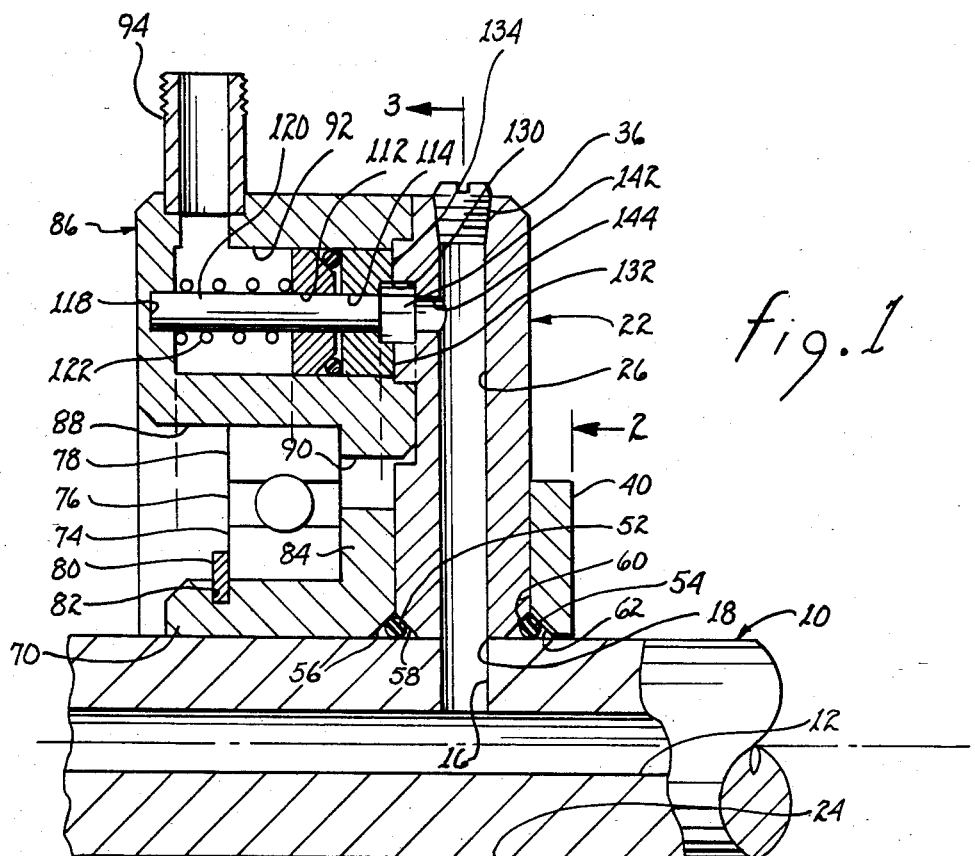
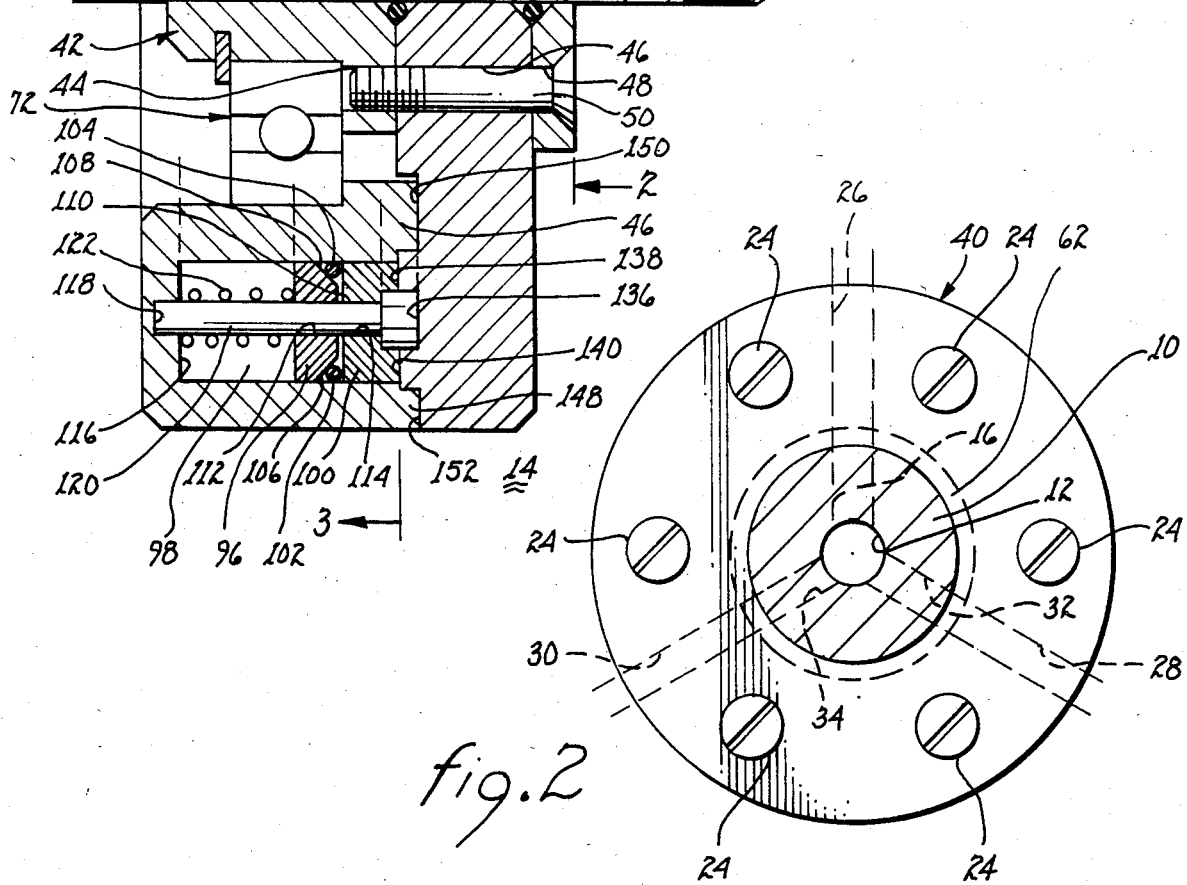

ROTARY COUPLING FOR FLUIDS

The present invention relates to couplings and, more particularly, to couplings for injecting a fluid radially into a hollow rotating shaft.

Fluid flow into and out of hollow rotating shafts is effected by prior art couplings at the end of the shaft. Such a coupling generally includes a rotating cylindrical element formed as part of or attached to the shaft and a commensurately configured stationary cylindrical element axially mates with the rotating cylindrical element. A seal therebetween to minimize fluid loss intermediate the cylindrical elements may be effected by close tolerance machining to achieve a surface to surface fluid flow tight fit or by various compressible sealing elements, such as low friction compressible sleeves, O-rings or the like. A number of embodiments of such axial flow couplings may be found in the prior art. Moreover, various devices have been developed for conveying fluid into or out of the end of a hollow shaft along a radial at the shaft end. Usually, the seals for such radial conveyance constitute mechanically equivalent seals to those employed with axial flow couplings. However, the prior art is devoid of an effective coupling for fluid communication radially of the bore of an hollow rotating shaft, other than at an end thereof, and with a stationary fluid plenum.

The coupling described below in detail includes a disc fixedly mounted to a rotating hollow shaft for rotation therewith and having passageways in fluid communication with the interior or bore of the shaft. An annular plenum is rotatably mounted upon the shaft to provide support for the plenum and rotation of the shaft independent of the plenum. The plenum is connected in fluid communication with a stationary source of fluid. A ring disposed within the plenum and having an axially oriented annular channel disposed therein mates with a corresponding channel in the disc, the latter channel being in fluid communication with the disc passageway. Fluid flow intermediate the plenum and disc is effected via the opposed mating channels. The respective surfaces on either side of each channel are machined to comport with the respective interfacing surface and form a seal to prevent fluid loss therebetween. Spring loading the ring within the plenum aids in biasing or urging the corresponding channel side surfaces adjacent one another to perform the sealing function. Thereby, effective fluid communication between a stationary source of fluid and the interior or bore of a rotating hollow shaft is effected.

It is therefore a primary object of the present invention to provide apparatus for fluid flow intermediate a stationary source and the interior of a rotating hollow shaft other than at an end of the shaft.

Another object of the present invention is to provide a method for conveying fluid intermediate a stationary source and the interior of a rotating hollow shaft at other than an end of the shaft.

Yet another object of the present invention is to provide means for injecting or withdrawing a fluid into or from the bore of a rotating hollow shaft anywhere along the length of the shaft.

Still another object of the present invention is to provide a method for injecting or withdrawing a fluid into or from a rotating hollow shaft anywhere along the length of the shaft.

A further object of the present invention is to provide interfacing elements circumscribing an hollow shaft anywhere along the length of the shaft for interconnecting a stationary source of fluid with the interior of the hollow shaft.

A yet further object of the present invention is to provide a coupling positionable anywhere along a rotating hollow shaft for providing fluid communication between the interior of the shaft and a stationary point.

A still further object of the present invention is to provide a method for effectively sealing a coupling for conveying fluid from a stationary source into a rotating hollow shaft anywhere along the length of the shaft.

These and further objects of the present invention will become apparent to those skilled in the art as the description thereof proceeds.

The present invention may be described with greater specificity and clarity with reference to the following drawings, in which:

FIG. 1 is a cross-sectional view of the coupling;

FIG. 2 is an end view taken along lines 2—2, as shown in FIG. 1;

Figure 3:
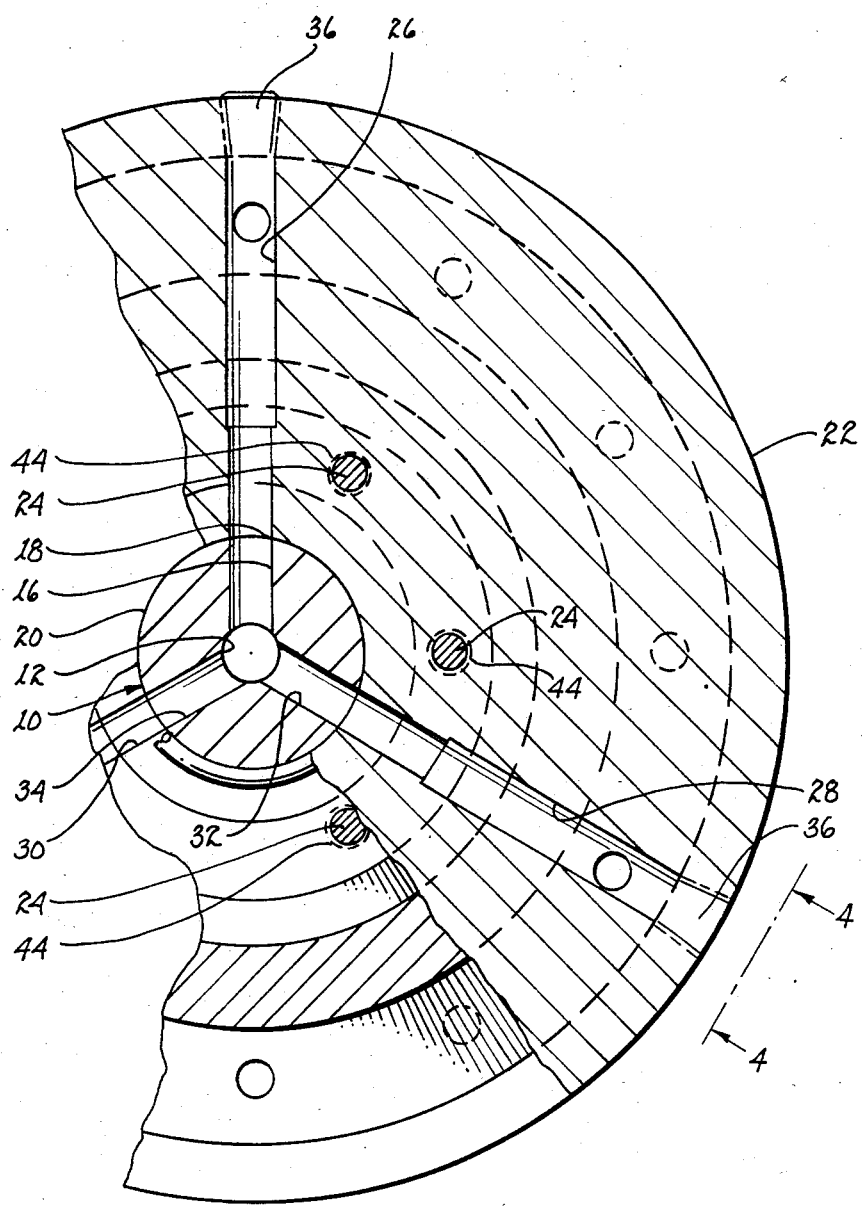
FIG. 3 is a cross-sectional view taken along lines 3—3, as shown in FIG. 1.

For explanatory purposes, the fluid flow and fluid containment structure to be described will identify air as the fluid but any gas or liquid can be equally well conveyed by the structure described. Moreover, while the fluid flow described is in reference to flow into an hollow shaft the flow may be in the reverse direction. Referring to FIG. 1, there is shown a rotatable hollow shaft 10 having a bore 12 into which a fluid is to be injected. As illustrated, coupling 14 may be disposed upon shaft 10 at any point therealong. Passageway 16 extends radially from bore 12 to an aperture 18 defined by circumferential surface 20 of the shaft.

Figure 4:
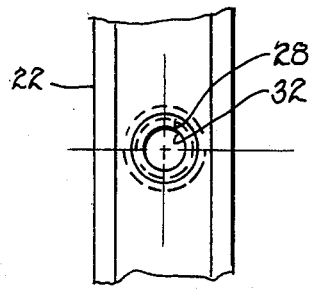
FIG. 4 is an end view taken along lines 4—4, as shown in FIG. 3.

A disc 22, as illustrated in FIGS. 1, 3 and 4, includes a central aperture 24 for penetrably receiving shaft 10. The disc includes at least one radially oriented passageway 26 extending therethrough and located coincident with passageway 16. As shown in FIG. 3, three equiangularly spaced passageways 26, 28 and 30 may be disposed in the disc to mate with corresponding passageways 16, 32 and 34 in shaft 10. The radial end of each passageway in the disc is sealed by a threaded plug 36 or the like.

A retainer 40 is mounted upon shaft 10 adjacent one side of disc 22. A collar 42 is mounted upon shaft 10 on the other side of the disc. The collar includes a plurality of equiangularly located threaded apertures 44; an equal number of equiangularly located holes 46, 48 are located in disc 22 and retainer 40, respectively; holes 48 may be counter sunk as shown. By penetrably engaging a bolt 50 with each set of corresponding holes 48, 46 and threaded aperture 44, the disc is effectively sandwiched between the retainer and the collar. To preclude air leakage intermediate the surface of aperture 24 and peripheral surface 20 of the shaft, O-rings 52 and 54 are disposed intermediate the junction adjacent the shaft between collar 42 and the disc and retainer 40 and the disc. The corresponding surfaces of the collar, disc and retainer may be beveled with bevels 56, 58, 60 and 62 to partially accommodate the corresponding O-rings and effect a squeeze fit with the shaft. Disc 22 is fixedly attached to shaft 10 and will rotate therewith to continuously maintain fluid communication intermediate passageways 26, 28 and 30 with bore 12 through passageways 16, 32 and 34, respectively.

Collar 42 includes a sleeve 70 circumscribing shaft 10. A bearing 72 having an inner race 74, a ball cage 76 and an outer race 78 is supported upon sleeve 70 and retained in place by a snap ring 80 nesting within an annular slot 82 in the sleeve. The location of the slot is selected to maintain bearing 72 adjacent radial flange 84 of collar 42.

A plenum ring 86 includes an inner cylindrical surface 88 for contactingly engaging and receiving support from outer race 78 of bearing 72. An inwardly directed radial flange 90 of plenum ring 86 bears against the side of outer race 78 and positions the plenum ring with respect to the bearing. The plenum ring includes an axially opening annular cavity 92. An inlet nipple 94 is in fluid communication with cavity 92 and interconnects the cavity with a source of air or other fluid under pressure (not shown).

A first ring 96 is axially slidably disposed within cavity 92 and defines with cavity 92 plenum 98 in fluid communication with the source of air under pressure. A second ring 100 is located within annular cavity 92 adjacent the first ring. Air flow intermediate the inner and outer perimeters of the rings and the corresponding surfaces of the cavity is precluded by O-rings 102 and 104, which O-rings are compressed intermediate bevels 106, 108, respectively and the corresponding portions of radial surface 110 of the second ring.

As shown in FIGS. 1 and 2, first and second rings 96, 100, each include twelve equiangularly spaced holes, 112, 114, respectively, extending therethrough. As particularly shown in FIG. 1, the first and second rings are rotationally oriented to position the respective holes in alignment. Base 116 of cavity 92 includes six equiangularly located circular cavities 118 disposed therein. Per force, these cavities are axially alignable with every other one of the holes disposed in the first and second rings. To maintain the holes of the rings in alignment with one another, a dowel 120 is fitted within each of cavities 118 to extend therefrom into penetrable engagement with every other one of holes 112, 114 of the first and second rings, respectively. The fit of the dowels in the respective cavities 118 may be a press fit or other means may be employed to maintain the dowels securely lodged therein. The fit of the dowels in the respective holes of the first and second rings may be purposely loose to permit a flow of air therepast without a substantial misalignment of the rings with one another. A coil spring 122 is loosely mounted upon each of dowels 120 between base 116 of cavity 92 and the first ring to urge the first ring axially away from base 116. For reasons described below, the axial movement of second ring 100 is restricted whereby the spring force exerted by the coil spring upon the first ring will tend to compress O-rings 102 and 104 between the rings to perform their respective sealing functions.

From the above description attendant plenum ring 86 it will be appreciated that while shaft 10 rotates, the plenum ring may be maintained stationary yet supported upon the shaft through operation of bearing 72.

Referring primarily to FIG. 1, there will now be described the structure attendant the interconnection between the stationary plenum ring and disc 22 rotating commensurate with shaft 10. An axially oriented channel 130 is disposed in second ring 100 to interconnect each of holes 114. Such interconnection permits air flow through the vacant ones of holes 114 into channel 130 as well as air flow through the gaps attendant the holes having inserted ones of dowels 120. A smooth annular surface 132 extends radially inwardly from edge of channel 130 and a similar smooth annular surface 134 extends radially outwardly from the opposed edge of the channel. Disc 22 includes an annular axially oriented channel 136 diametrically coincident with channel 130. A smooth annular surface 138 radially inward of the edge of channel 136 mates with corresponding surface 134 of second ring 100. A further smooth annular surface 140 is disposed radially outwardly of the edge of channel 136 and mates with corresponding surface 132 of second ring 100. By careful machining and maintaining of a relatively radially wide area of mating surfaces 138, 132 and 140, 134 an effective seal can be formed therebetween. It is to be understood that as described above, surfaces 132 and 134 are stationary while surfaces 138 and 140 rotate in contacting relationship thereto in response to rotation of shaft 10. The resulting interface will have a tendency to hone the respective surfaces and obtain an exact fit therebetween to essentially preclude any air flow loss therethrough. It may be appreciated that the pressure of the surfaces bearing against one another is a function of coil spring 122. Since chamber 142 formed by channels 138 and 136 is at the same pressure as that present in plenum 98, there will exist no tendency for second ring 100 to separate from disc 22 due to the air pressure within chamber 142.

Air flow from chamber 142 into passageways 26, 28 and 30 in disc 22 is effected through each of passageways 144 interconnecting the respective one of passageways 26, 28 and 30 with channel 136. Since channel 136 is in continuous contact with channel 130, air will flow continuously from chamber 142 through each of passageways 144 into passageways 26, 28 and 30. The air flow from passageways 26, 28 and 30 is continually injected into bore 12 of shaft 10 through passageways 16, 32 and 34.

Plenum ring 86 may include annular bands 146, 148, for keying and alignment purposes; these bands and the corresponding depressions 152, 150 in disc 22 also serve as radial convoluted paths for any air flow which might exist intermediate the interfacing surfaces of the plenum ring and the disc. The convoluted paths establish pressure losses of any air flow therethrough and thereby further augment the seal intermediate the interfacing means of the plenum ring and the disc.

From the above description, it will become apparent that coupling 14 may be disposed anywhere along shaft 10 and is not restricted by the nature of its seals to an axial end of the shaft, as is true of prior art couplings. Moreover, the structure of the coupling is totally independent of the size of the shaft and the size of the bore within the shaft. It is further to be understood that the number of passageways 26, 28 and 30 within disc 22 is a function of the fluid pressures and flow rates desired and not the operation of the coupling; however, good practice dictates that static and dynamic balancing requirements of the disc suggests equiangular placement of passageways 26, 28 and 30 to avoid the need for counterweights. The number and size of apertures in the first and second rings is also a function of the fluid pressure and flow rates desired rather than being a function of operative aspects of the coupling. While a plurality of dowels 120 are illustrated to key and maintain in alignment the first and second rings, this number may be reduced to one for keying purposes, provided that due consideration be given to the application of a spring force or other urging means to maintain a closely coupled interface between the second ring and the disc to provide a seal against fluid flow loss from chamber 144.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A rotary coupling for conveying a fluid into a rotating hollow shaft from a stationary source of fluid under pressure, said coupling comprising in combination:
   (a) rotating means axially and radially fixedly attached to the shaft for directing the fluid into the hollow shaft, said rotating means including a first generally radial annular surface means and at least one passageway having an inlet radially circumscribed by first annular surface means;
   (b) annular stationary means connectable to the source of fluid for receiving fluid from the source, said annular stationary means being rotatably mounted upon the shaft to permit rotation of the shaft without corresponding rotation of said annular stationary means;
   (c) an annular plenum disposed within said stationary means for receiving the fluid from the source;
   (d) a first ring disposed within said annular plenum, said first ring including a first plurality of axially aligned holes extending therethrough;
   (e) a second ring disposed within said annular plenum, said second ring including a second plurality of axially aligned holes extending therethrough;
   (f) dowel means located with said annular plenum for maintaining said first and second plurality of hole in aligned relationship;
   (g) means for developing a seal with said plenum intermediate the inner perimeters of said first and second rings and further means for developing a further seal with said plenum intermediate the outer perimeters of said first and second rings to prevent fluid flow intermediate the plenum and the respective inner and outer perimeters;
   (h) means for urging said first ring against said second ring;
   (i) a second generally radial annular surface means disposed in said second ring and radially circumscribing said second plurality of holes, said second generally radial annular surface means being in mating relationship with said first generally radially annular surface means to form a seal therebetween in response to the force exerted by said urging means; and
   (j) channel means interconnecting said second plurality of holes with one another and with the inlets of each of said passageways in said rotating means for conveying the fluid from said second plurality of holes to at least one of said passageways.

2. The coupling as set forth in claim 1 wherein said dowel means is penetrably associated with at least some of said first and second plurality of holes.

3. The coupling as set forth in claim 1 wherein said urging means includes spring means supported upon at least some of said dowel means.

4. A rotary coupling for conveying a fluid into a rotating hollow shaft from a stationary source of fluid under pressure, said coupling comprising in combination:
   (a) rotating means axially and radially fixedly attached to the shaft for directing the fluid into the hollow shaft, said rotating means including a first generally radial annular surface means and at least one passageway having an inlet radially circumscribed by said first annular surface means;
   (b) annular stationary means connectable to the source of fluid for receiving fluid from the source, said annular stationary means being rotatably mounted upon the shaft to permit rotation of the shaft without corresponding rotation of said annular stationary means;
   (c) an annular plenum disposed within said stationary means for receiving the fluid from the source;
   (d) a first ring disposed within said annular plenum, said first ring including a first plurality of axially aligned holes extending therethrough;
   (e) a second ring disposed within said annular plenum, said second ring including a second plurality of axially aligned holes extending therethrough;
   (f) seal means disposed intermediate said first and second rings and said plenum for sealing against fluid flow adjacent the inner and outer peripheral surfaces of said second ring and said plenum;
   (g) means for maintaining coincident at least some of said first plurality of holes with at least some of second plurality of holes;
   (h) means for urging said first ring against said second ring;
   (i) a second generally radial annular surface means disposed in said second ring and radially circumscribing said second plurality of holes, said second generally radial annular surface means being in mating relationship with said first generally radially annular surface means to form a seal therebetween in response to the force exerted by said urging means; and
   (j) channel means interconnecting said second plurality of holes with one another and with the inlets of each of said passageways in said rotating means for conveying the fluid from said second plurality of holes to passageways.

* * * * *